US011093720B2

(12) United States Patent
Beck et al.

(10) Patent No.: US 11,093,720 B2
(45) Date of Patent: Aug. 17, 2021

(54) APPARATUS, METHOD, AND PROGRAM PRODUCT FOR CONVERTING MULTIPLE LANGUAGE VARIATIONS

(71) Applicant: LENOVO (Singapore) PTE. LTD., New Tech Park (SG)

(72) Inventors: Kevin Wayne Beck, Raleigh (JP); Russell Speight VanBlon, Raleigh, NC (US); Thorsten Peter Stremlau, Morrisville, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 218 days.

(21) Appl. No.: 16/368,711

(22) Filed: Mar. 28, 2019

(65) Prior Publication Data

US 2020/0311211 A1 Oct. 1, 2020

(51) Int. Cl.
*G06F 40/58* (2020.01)
*G10L 15/26* (2006.01)

(52) U.S. Cl.
CPC .............. *G06F 40/58* (2020.01); *G10L 15/26* (2013.01)

(58) Field of Classification Search
CPC ..... G10L 15/065; G10L 15/26; G10L 15/063; G10L 15/16; G10L 15/183; G06N 3/08; G06F 40/58
See application file for complete search history.

(56) References Cited

U.S. PATENT DOCUMENTS

| 6,154,720 | A  | * | 11/2000 | Onishi    | G06F 40/47  |
|           |    |   |         |           | 704/2       |
| 6,208,964 | B1 | * | 3/2001  | Sabourin  | G10L 15/063 |
|           |    |   |         |           | 704/235     |
| 6,266,642 | B1 | * | 7/2001  | Franz     | G06F 40/268 |
|           |    |   |         |           | 704/277     |
| 6,278,968 | B1 | * | 8/2001  | Franz     | G06F 40/56  |
|           |    |   |         |           | 704/3       |
| 6,282,507 | B1 | * | 8/2001  | Horiguchi | G06F 40/211 |
|           |    |   |         |           | 704/3       |
| 6,356,865 | B1 | * | 3/2002  | Franz     | G10L 15/26  |
|           |    |   |         |           | 704/2       |
| 9,245,278 | B2 | * | 1/2016  | Orsini    | G06F 40/242 |

(Continued)

OTHER PUBLICATIONS

David Imseng et al., "Towards mixed language speech recognition systems", Interspeech 2010, Sep. 26-30, 2010, pp. 278-281.

*Primary Examiner* — Mohammad K Islam

(74) *Attorney, Agent, or Firm* — Kunzler Bean & Adamson

(57) ABSTRACT

Apparatuses, methods, and program products are disclosed for converting multiple language variations. One apparatus includes a processor, a sensor, and a memory that stores code executable by the processor. The code is executable by the processor to: determine a priority ranking corresponding to each language variation of multiple language variations, wherein each language variation includes a language, a dialect, or a combination thereof; detect, by use of the sensor, an audible input; convert the audible input to text based on a first language variation, wherein the priority ranking of the first language variation is a highest priority; and in response to a portion of the text being incorrect, convert the audible input corresponding to the portion of the text to a revised portion of the text based on a second language variation, wherein the priority ranking of the second language variation is a second highest priority.

14 Claims, 6 Drawing Sheets

(56) References Cited

U.S. PATENT DOCUMENTS

| | | | | |
|---|---|---|---|---|
| 9,400,786 B2* | 7/2016 | Lancaster | | G06F 40/40 |
| 9,418,655 B2* | 8/2016 | Yassa | | G06F 40/58 |
| 9,477,652 B2* | 10/2016 | Huang | | G06F 40/35 |
| 9,483,461 B2* | 11/2016 | Fleizach | | G06F 40/263 |
| 9,582,489 B2* | 2/2017 | McAteer | | G06F 40/232 |
| 9,734,142 B2* | 8/2017 | Huang | | G06F 40/117 |
| 9,864,744 B2* | 1/2018 | Eck | | G06F 40/45 |
| 10,354,650 B2* | 7/2019 | Gruenstein | | G10L 15/26 |
| 10,402,500 B2* | 9/2019 | Chochowski | | G10L 17/00 |
| 2007/0033026 A1* | 2/2007 | Bartosik | | G06F 40/242 |
| | | | | 704/233 |
| 2009/0210213 A1* | 8/2009 | Cannon | | G06F 40/58 |
| | | | | 704/2 |
| 2011/0046940 A1* | 2/2011 | Tanaka | | G06F 40/58 |
| | | | | 704/2 |
| 2012/0173222 A1* | 7/2012 | Wang | | G06F 40/232 |
| | | | | 704/2 |
| 2013/0060559 A1* | 3/2013 | Ryu | | G06F 40/58 |
| | | | | 704/3 |
| 2013/0132069 A1* | 5/2013 | Wouters | | G10L 13/06 |
| | | | | 704/8 |
| 2013/0144597 A1* | 6/2013 | Waibel | | G06F 40/58 |
| | | | | 704/2 |
| 2013/0346077 A1* | 12/2013 | Mengibar | | G06F 16/3346 |
| | | | | 704/235 |
| 2014/0187210 A1* | 7/2014 | Chang | | H04M 3/568 |
| | | | | 455/414.1 |
| 2014/0365200 A1* | 12/2014 | Sagie | | G06F 40/51 |
| | | | | 704/2 |
| 2015/0081270 A1* | 3/2015 | Kamatani | | G06F 40/58 |
| | | | | 704/2 |
| 2015/0154183 A1* | 6/2015 | Kristjansson | | G10L 13/00 |
| | | | | 704/3 |
| 2015/0363388 A1* | 12/2015 | Herdagdelen | | G06Q 10/10 |
| | | | | 704/2 |
| 2016/0162575 A1* | 6/2016 | Eck | | G06F 40/58 |
| | | | | 707/776 |
| 2016/0179774 A1* | 6/2016 | McAteer | | G06F 40/232 |
| | | | | 704/9 |
| 2017/0025120 A1* | 1/2017 | Dayan | | G06F 16/3335 |
| 2017/0083504 A1* | 3/2017 | Huang | | G06F 40/117 |
| 2017/0148432 A1* | 5/2017 | Jaramillo | | G10L 15/22 |
| 2018/0047395 A1* | 2/2018 | Sommers | | G06F 40/58 |
| 2018/0143956 A1* | 5/2018 | Skarbovsky | | G10L 15/26 |
| 2018/0233150 A1* | 8/2018 | Gruenstein | | G10L 15/26 |
| 2018/0329894 A1* | 11/2018 | Zhao | | G06F 40/53 |
| 2020/0043498 A1* | 2/2020 | Chae | | G10L 15/26 |
| 2020/0143793 A1* | 5/2020 | Saeki | | G06F 40/47 |
| 2020/0193971 A1* | 6/2020 | Feinauer | | G10L 17/02 |
| 2020/0193972 A1* | 6/2020 | Feinauer | | G10L 15/005 |
| 2020/0226327 A1* | 7/2020 | Matusov | | G06F 40/42 |
| 2020/0250383 A1* | 8/2020 | Cheng | | G06F 40/44 |
| 2020/0285699 A1* | 9/2020 | Nogima | | G06F 40/35 |
| 2020/0335100 A1* | 10/2020 | Saon | | G10L 15/07 |
| 2020/0387677 A1* | 12/2020 | Kim | | G06F 40/47 |

* cited by examiner

APPARATUS, METHOD, AND PROGRAM PRODUCT FOR CONVERTING MULTIPLE LANGUAGE VARIATIONS

FIELD

The subject matter disclosed herein relates to speech-to-text and more particularly relates to converting multiple language variations.

BACKGROUND

Description of the Related Art

Information handling devices, such as desktop computers, laptop computers, tablet computers, smart phones, optical head-mounted display units, smart watches, televisions, streaming devices, etc., are ubiquitous in society. These information handling devices may be used for performing various actions. For example, an information handling device may perform speech-to-text conversions. Such conversions may be performed inaccurately.

BRIEF SUMMARY

An apparatus for converting multiple language variations is disclosed. A method and computer program product also perform the functions of the apparatus. In one embodiment, the apparatus includes a processor, a sensor, and a memory that stores code executable by the processor. The code, in various embodiments, is executable by the processor to determine a priority ranking corresponding to each language variation of multiple language variations. In such embodiments, each language variation of the multiple language variations includes a language, a dialect, or a combination thereof. The code, in certain embodiments, is executable by the processor to detect, by use of the sensor, an audible input. The code, in some embodiments, is executable by the processor to convert the audible input to text based on a first language variation of the multiple language variations. In such embodiments, the priority ranking of the first language variation is a highest priority. The code, in various embodiments, is executable by the processor to, in response to a portion of the text being incorrect, convert the audible input corresponding to the portion of the text to a revised portion of the text based on a second language variation of the multiple language variations. In such embodiments, the priority ranking of the second language variation is a second highest priority.

In some embodiments, the code executable by the processor receives a user selection that indicates the multiple language variations corresponding to the user. In one embodiment, the code executable by the processor receives a user selection that indicates the priority ranking.

In various embodiments, the code executable by the processor receives a user selection that indicates the priority ranking for each geographic region of multiple geographic regions. In some embodiments, the code executable by the processor detects a physical location of a user and sets a priority of the priority ranking to a language variation of the multiple language variations that corresponds to the physical location.

A method for converting multiple language variations, in one embodiment, includes determining a priority ranking corresponding to each language variation of multiple language variations. In such an embodiment, each language variation of the multiple language variations includes a language, a dialect, or a combination thereof. In certain embodiments, the method includes detecting, by use of a sensor, an audible input. In some embodiments, the method includes converting the audible input to text based on a first language variation of the multiple language variations. In such embodiments, the priority ranking of the first language variation is a highest priority. In various embodiments, the method includes in response to a portion of the text being incorrect, converting the audible input corresponding to the portion of the text to a revised portion of the text based on a second language variation of the multiple language variations. In such embodiments, the priority ranking of the second language variation is a second highest priority.

In some embodiments, the method includes receiving a user selection that indicates the multiple language variations corresponding to the user. In various embodiments, the method includes receiving a user selection that indicates the priority ranking. In one embodiment, the method includes receiving a user selection that indicates the priority ranking for each geographic region of multiple geographic regions.

In some embodiments, the method includes detecting a physical location of a user and setting a priority of the priority ranking to a language variation of the multiple language variations that corresponds to the physical location. In certain embodiments, the method includes determining whether the portion of the text is incorrect.

In some embodiments, determining whether the portion of the text is incorrect includes: determining whether the portion of the text is a word in the first language variation; in response to determining that the portion of the text is not a word in the first language variation, determining that the portion of the text is incorrect; and in response to determining that the portion of the text is a word in the first language variation, determining whether the portion of the text is contextually proper, wherein: in response to determining that the portion of the text is not contextually proper, determining that the portion of the text is incorrect; and in response to determining that the portion of the text is contextually proper, determining that the portion of the text is correct. In various embodiments, the method includes, in response to converting the audible input corresponding to the portion of the text to the revised portion of the text, requesting feedback from a user to indicate whether the revised portion of the text is correct. In certain embodiments, the method includes, in response to the user indicating that the revised portion of the text is correct, replacing the portion of the text with the revised portion of the text.

In one embodiment, a program product includes a computer readable storage medium that stores code executable by a processor. The executable code, in certain embodiments, includes code to perform determining a priority ranking corresponding to each language variation of multiple language variations. In such embodiments, each language variation of the multiple language variations includes a language, a dialect, or a combination thereof. The executable code, in various embodiments, includes code to perform detecting, by use of a sensor, an audible input. The executable code, in some embodiments, includes code to perform converting the audible input to text based on a first language variation of the multiple language variations. In such embodiments, the priority ranking of the first language variation is a highest priority. The executable code, in certain embodiments, includes code to perform, in response to a portion of the text being incorrect, converting the audible input corresponding to the portion of the text to a revised portion of the text based on a second language variation of the multiple language variations. In such embodiments, the priority ranking of the second language variation is a second highest priority.

In certain embodiments, the executable code further includes code to perform detecting a physical location of a user and setting a priority of the priority ranking to a language variation of the multiple language variations that corresponds to the physical location.

In one embodiment, the executable code further includes code to perform determining whether the portion of the text is incorrect. In certain embodiments, determining whether the portion of the text is incorrect includes: determining whether the portion of the text is a word in the first language variation; in response to determining that the portion of the text is not a word in the first language variation, determining that the portion of the text is incorrect; and in response to determining that the portion of the text is a word in the first language variation, determining whether the portion of the text is contextually proper, wherein: in response to determining that the portion of the text is not contextually proper, determining that the portion of the text is incorrect; and in response to determining that the portion of the text is contextually proper, determining that the portion of the text is correct.

In various embodiments, the executable code further includes code to perform, in response to converting the audible input corresponding to the portion of the text to the revised portion of the text, requesting feedback from a user to indicate whether the revised portion of the text is correct. In some embodiments, the executable code further includes code to perform, in response to the user indicating that the revised portion of the text is correct, replacing the portion of the text with the revised portion of the text.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
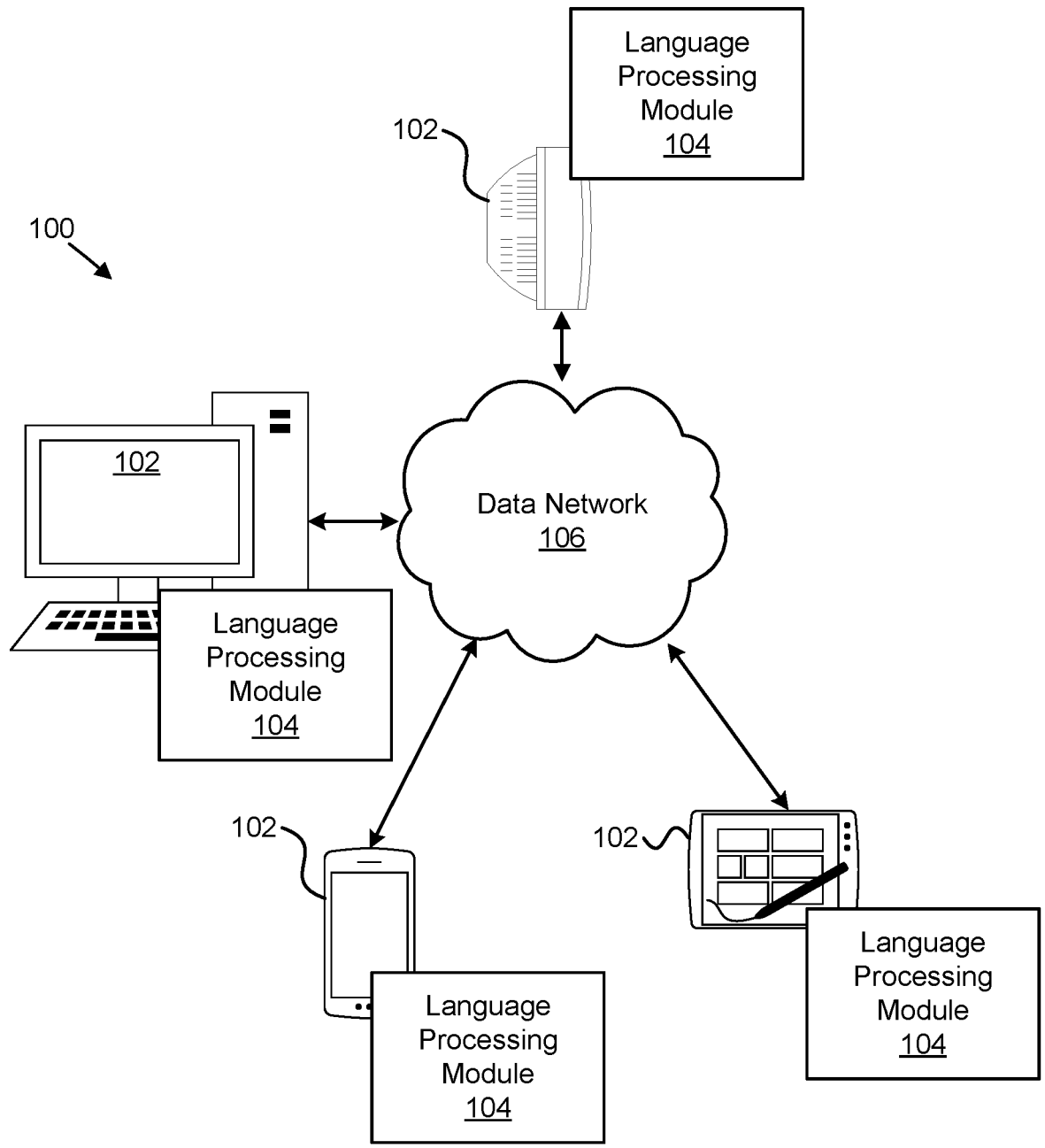
FIG. 1 is a schematic block diagram illustrating one embodiment of a system for converting multiple language variations.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for converting multiple language variations. In one embodiment, the system 100 includes information handling devices 102, language processing modules 104, and data networks 106. Even though a specific number of information handling devices 102, language processing modules 104, and data networks 106 are depicted in FIG. 1, one of skill in the art will recognize that any number of information handling devices 102, language processing modules 104, and data networks 106 may be included in the system 100.

In one embodiment, the information handling devices 102 include computing devices, such as desktop computers, laptop computers, personal digital assistants (PDAs), tablet computers, smart phones, cellular phones, smart televisions (e.g., televisions connected to the Internet), set-top boxes, game consoles, security systems (including security cameras), vehicle on-board computers, network devices (e.g., routers, switches, modems), streaming devices, or the like. In some embodiments, the information handling devices 102 include wearable devices, such as smart watches, fitness bands, optical head-mounted displays, or the like. The information handling devices 102 may access the data network 106 directly using a network connection.

In some configurations, the information handling devices 102 may only recognize one primary language variation corresponding to a user. If the user uses a language variation that is not part of the primary language variation, the information handling device 102 may incorrectly process the language variation as a match of some word or phrase in the primary language variation and/or not process the language variation.

The information handling devices 102 may include an embodiment of the language processing module 104. In certain embodiments, the language processing module 104 may determine a priority ranking corresponding to each language variation of multiple language variations. In such embodiments, each language variation of the multiple language variations includes a language and/or a dialect. The language processing module 104 may also detect, by use of the sensor, an audible input. The language processing module 104 may convert the audible input to text based on a first language variation of the multiple language variations. The priority ranking of the first language variation may be a highest priority. The language processing module 104 may also, in response to a portion of the text being incorrect, convert the audible input corresponding to the portion of the text to a revised portion of the text based on a second language variation of the multiple language variations. The priority ranking of the second language variation may be a second highest priority. In this manner, the language processing module 104 may be used for converting multiple language variations.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
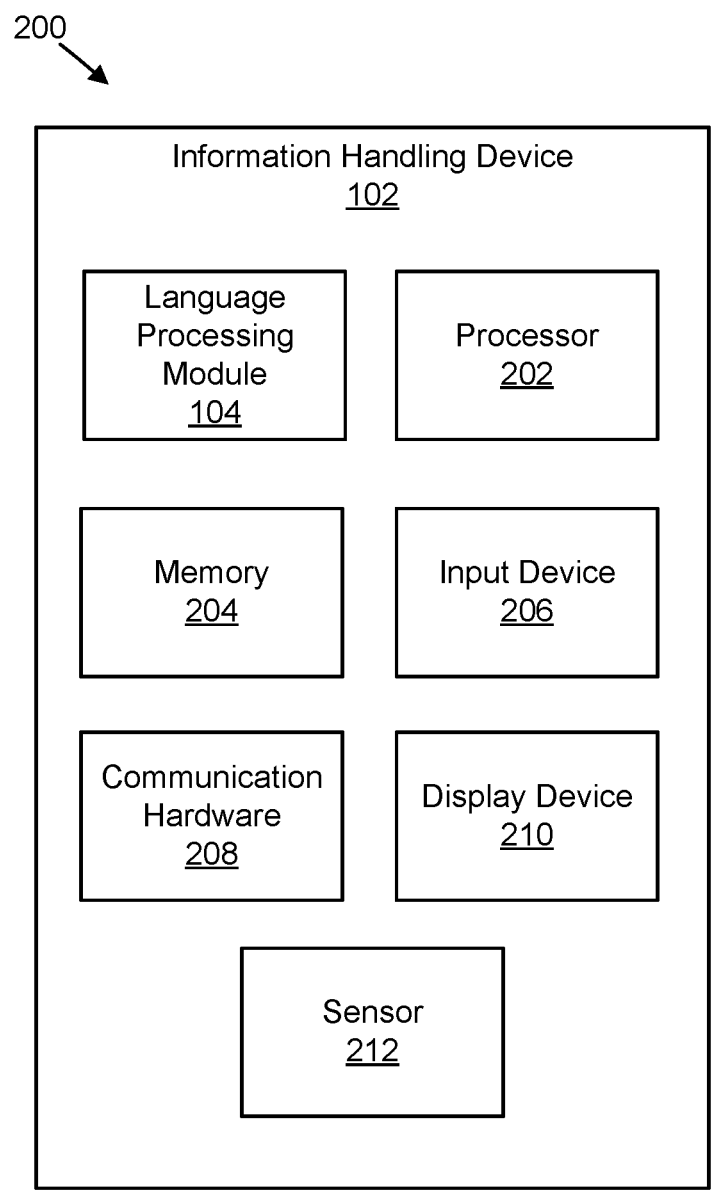
FIG. 2 is a schematic block diagram illustrating one embodiment of an apparatus including an information handling device.

FIG. 2 depicts one embodiment of an apparatus 200 that may be used for converting multiple language variations. The apparatus 200 includes one embodiment of the information handling device 102. Furthermore, the information handling device 102 may include the language processing module 104, a processor 202, a memory 204, an input device 206, communication hardware 208, a display device 210, and a sensor 212. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the language processing module 104, the input device 206, the communication hardware 208, the display device 210, and the sensor 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores data relating to converting multiple language variations. In some embodiments, the memory 204 also stores program code and related data, such as an operating system or other controller algorithms operating on the information handling device 102.

The information handling device 102 may use the language processing module 104 for converting multiple language variations. As may be appreciated, the language processing module 104 may include computer hardware, computer software, or a combination of both computer hardware and computer software. For example, the language processing module 104 may include circuitry, or a processor, used to determine a priority ranking corresponding to each language variation of multiple language variations, wherein each language variation of the multiple language variations includes a language, a dialect, or a combination thereof. As another example, the language processing module 104 may include computer program code that detects, by use of the sensor 212, an audible input. As a further example, the language processing module 104 may include computer program code that converts the audible input to text based on a first language variation of the multiple language variations, wherein the priority ranking of the first language variation is a highest priority. As another example, the language processing module 104 may include computer program code that, in response to a portion of the text being incorrect, converts the audible input corresponding to the portion of the text to a revised portion of the text based on a second language variation of the multiple language variations, wherein the priority ranking of the second language variation is a second highest priority.

The input device 206, in one embodiment, may include any known computer input device including a touch panel, a button, a keyboard, a stylus, or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime). In some embodiments, the display device 210 includes one or more haptic devices for producing vibrations, motion, or other haptic feedback. For example, the display device 210 may produce haptic feedback upon performing an action.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the language processing module 104.

The sensor 212 may be any suitable type of sensor that can receive an audible input. For example, the sensor 212 may include a microphone, a sound transducer, a sound receiver, a sound sensor, an audio sensor, and/or the like.

Figure 3:
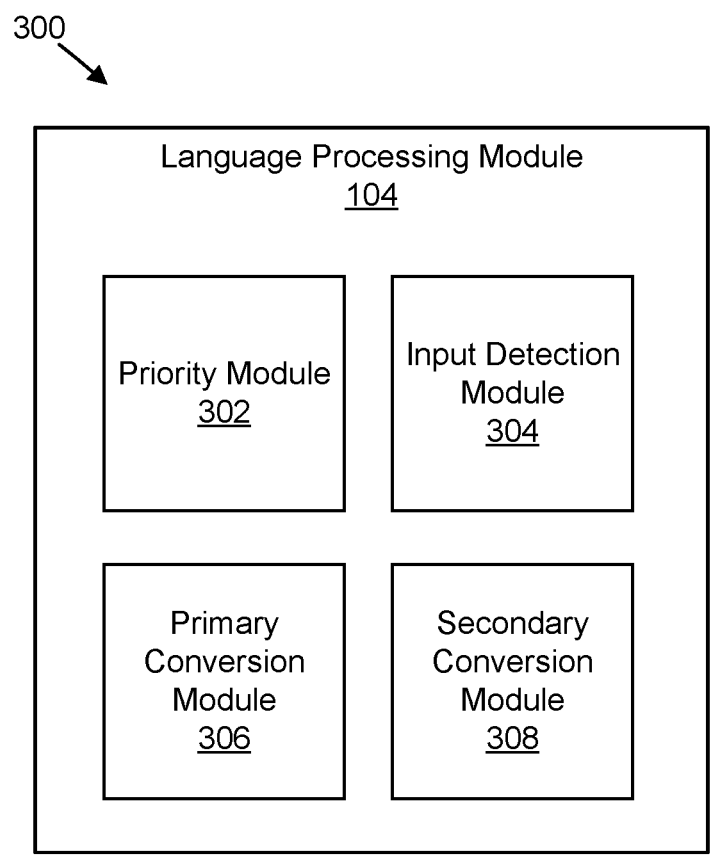
FIG. 3 is a schematic block diagram illustrating one embodiment of an apparatus including a language processing module.

FIG. 3 depicts a schematic block diagram illustrating one embodiment of an apparatus 300 that includes one embodiment of the language processing module 104. Furthermore, the language processing module 104 includes a priority module 302, an input detection module 304, a primary conversion module 306, and a secondary conversion module 308.

In certain embodiments, the priority module 302 may determine a priority ranking corresponding to each language variation of multiple language variations. As may be appreciated, each language variation of the multiple language variations may include a language and/or a dialect. The priority ranking may indicate an order of use corresponding to language variations that a user uses. Some examples of language variations include: English, Spanish, French, Italian, American English, North Eastern American English, Southern American English, British English, Australian English, Scottish English, Pakistani English, and so forth.

The priority ranking may be used to convert an audible input to text corresponding to the audible input. The highest ranking language variation may be used to convert the audible input to text. If a portion of the text is incorrect based on the highest ranking language variation, the next highest ranking language variation may be used to convert the portion of the text. If any of the portion of the text is incorrect based on the next highest ranking language variation, a third highest ranking language variation may be used to convert the incorrect portion of the text, and so forth. In one example, a priority ranking may include English as a highest ranking language variation (e.g., number 1 ranked language variation, top ranked language variation), Spanish as a next highest ranking language variation (e.g., number 2 ranked language variation, second highest ranking language variation), and French as a third highest ranking language variation (e.g., number 3 ranked language variation).

In certain embodiments, a profile corresponding to a user may indicate the language variations spoken by the user, a priority ranking corresponding to the user's use of the language variations, and/or a priority ranking corresponding to the user's use of the language variations based on a geographic location (e.g., country, region of the country, physical address, etc.). In such embodiments, the profile may indicate whether the user is multilingual and may include information that can be used to determine an order that the language variations are used for converting audio input into text. A profile ranking corresponding to a user's use of a language variation based on a geographic location may indicate how the user uses different language variations based on where the user is geographically located. For example, if the user is in the United States, the user may have a language variation ranking from highest to lowest as follows: English, German, and Japanese. As another example, if the same user is in Japan, the user may have a language variation ranking from highest to lowest as follows: English, Japanese, and German. Accordingly, if the user moves between different geographic locations, the priority for the language variations may be automatically updated based on the user profile.

In certain embodiments, if the user does not have a priority ranking corresponding to the user's use of the language variations based on a geographic location defined, priority ranking may still be changed based on a geographic location corresponding to the user. In some embodiments, by default, if a standard language variation of a geographic location matches a language variation corresponding to the user, the user's highest priority ranking language variation may be set to the standard language variation.

In one example, a profile for a user may indicate a highest priority ranking language variation as English, and a second highest priority ranking language variation as Japanese. In this example, the user may provide an audible input of "remind me to bring my kasa tomorrow" to the information handling device 102. "Kasa" is a Japanese word meaning umbrella in English. As the language processing module 104 interprets the audible input using English first, kasa may not be recognized as an English word. Accordingly, the language processing module 104 may determine whether kasa is a Japanese word. Upon determining that kasa is a Japanese word, the language processing module 104 may replace kasa with umbrella in the text result produced from the audible input.

In one embodiment, the input detection module 304 may detect, by use of a sensor (e.g., the sensor 212), an audible input. The audible input may be detected so that the audible input can be converted to text. In some embodiments, the audible input is detected and then stored in the memory 204 before being converted to text. The audible input may include one or more language variations spoken by a user.

In various embodiments, the primary conversion module 306 may convert the audible input to text based on a first language variation of the multiple language variations. In such embodiments, the priority ranking of the first language variation may be a highest priority among the multiple language variations (e.g., a higher priority than all other language variations of the multiple language variations). The primary conversion module 306 may use various language processing techniques to convert the audible input to text. For example, the primary conversion module 306 may determine whether the text is contextually proper based on a context of the words making up the text. In such an example, the audible input may be "I ate the pan that I purchased from the bakery." Because it is not normal for a person to eat a pan, the primary conversion module 306 may determine that the term pan in English is not contextually proper (e.g., incorrect).

In certain embodiments, the secondary conversion module 308, in response to a portion of the text being incorrect, may convert the audible input corresponding to the portion of the text to a revised portion of the text based on a second language variation of the multiple language variations. In such embodiments, the priority ranking of the second language variation may be a second highest priority among the multiple language variations (e.g., a higher priority than all other language variations of the multiple language variations except the first language variation). For example, the primary conversion module 306 may determine that the term pan in English (e.g., the first language variation) is not contextually proper (e.g., incorrect) in the audible input "I ate the pan that I purchased from the bakery." Accordingly, the secondary conversion module 308 may use a second language variation defined to be Spanish to determine that pan in Spanish is translated as bread in English. This may result in the audible input being converted to the following text: "I ate the bread that I purchased from the bakery."

Figure 4:
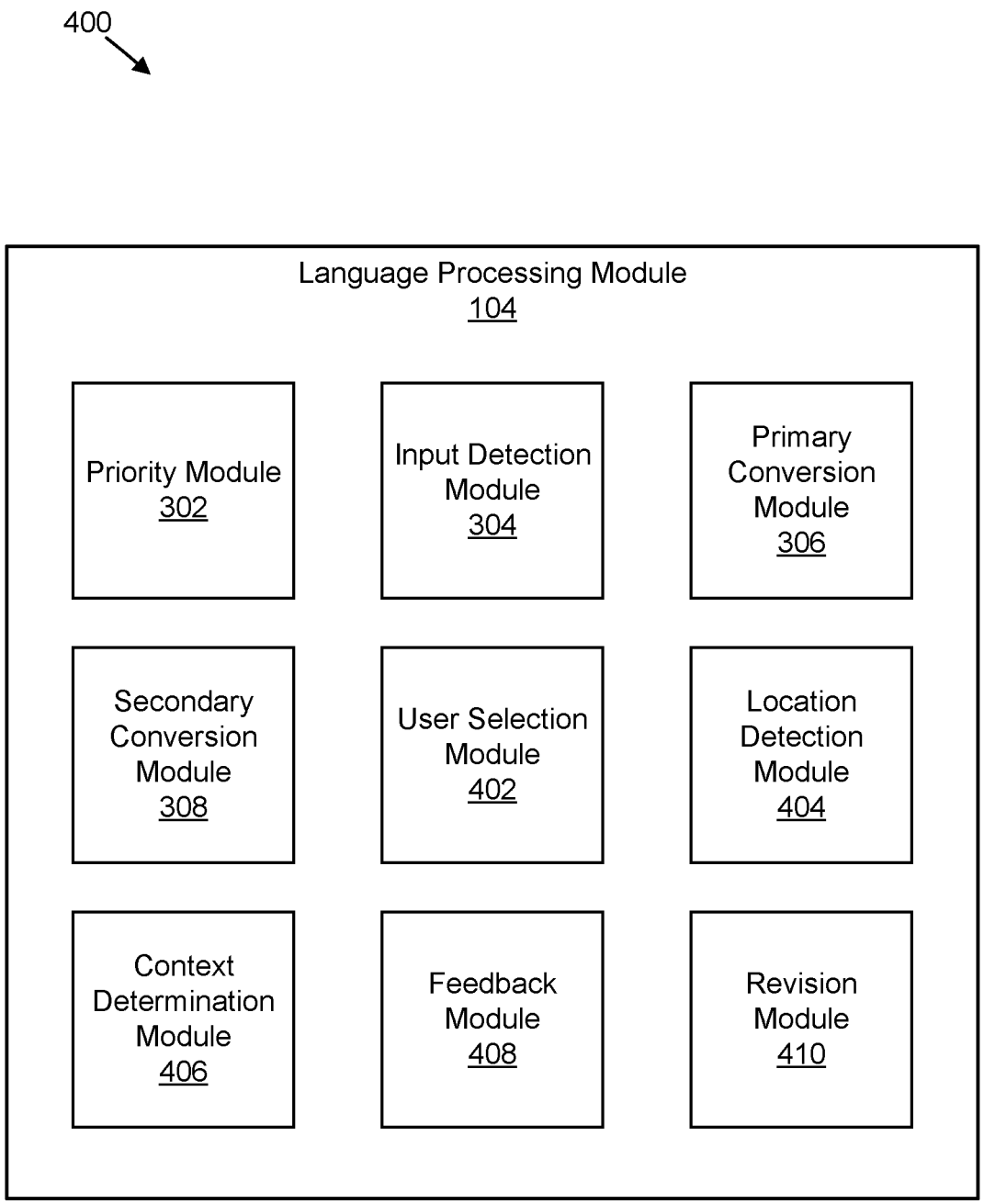
FIG. 4 is a schematic block diagram illustrating another embodiment of an apparatus including a language processing module.

FIG. 4 is a schematic block diagram illustrating another embodiment of an apparatus 400 that includes one embodiment of the language processing module 104. Furthermore, the language processing module 104 includes one embodiment of the priority module 302, the input detection module 304, the primary conversion module 306, and the secondary conversion module 308, that may be substantially similar to the priority module 302, the input detection module 304, the primary conversion module 306, and the secondary conversion module 308 described in relation to FIG. 3. The language processing module 104 also includes a user selection module 402, a location detection module 404, a context determination module 406, a feedback module 408, and a revision module 410.

In some embodiments, the user selection module 402 may receive one or more user selections that a user provides to select information corresponding to the user. In one embodiment, the user selection module 402 may receive a user selection that indicates language variations corresponding to the user. In such an embodiment, the user may select and/or input language variations that the user uses while speaking. This may include different languages and/or different dialects. For example, the user may indicate that they speak American English, Spanish, and British English.

In certain embodiments, the user selection module 402 may receive a user selection that indicates a priority ranking corresponding to the language variations that the user uses while speaking. The priority ranking may rank the language variation that the user uses the most as a highest priority ranking language variation, the language variation that the user uses second most as a second highest ranking language variation, the language variation that the user uses third as the third highest ranking language variation, and so forth. For example, the user may indicate the following priority ranking from highest to lowest priority: American English, British English, and Spanish.

In various embodiments, the user selection module 402 may receive a user selection that indicates a priority ranking for each geographic region (e.g., location) of multiple geographic regions (e.g., locations). This user selection may indicate that in certain geographic regions a priority of the language variations should change. For example, for a United States geographic region, the user may indicate the following priority ranking from highest to lowest priority: American English, British English, and Spanish. As another example, for a United Kingdom geographic region, the user may indicate the following priority ranking from highest to lowest priority: British English, American English, and Spanish. As a further example, for a Mexico geographic region, the user may indicate the following priority ranking from highest to lowest priority: American English, Spanish, and British English. As yet another example, for all geographic regions except the United States, United Kingdom, and Mexico, the user may indicate the following priority ranking from highest to lowest priority: British English, Spanish, and American English.

In certain embodiments, the location detection module 404 may detect a physical location (e.g., geographic region, geographic location) of a user and may set a priority of a priority ranking to a language variation of the multiple language variations that corresponds to the physical location. For example, if a user has the following language variations: American English, Italian, and Hindi, and the user is physically located in the United States, the highest priority ranking may be set to American English. As another example, if a user has the following language variations: American English, Italian, and Hindi, and the user is physically located in Europe, the highest priority ranking may be set to Italian. As a further example, if a user has the following language variations: American English, Italian, and Hindi, and the user is physically located in India, the highest priority ranking may be set to Hindi.

In various embodiments, the context determination module 406 may determine whether a portion of the text is incorrect. Determining whether the portion of the text is incorrect may include determining whether the portion of the text is a word or phrase in the first language variation. If it is determined that the portion of the text is not a word or phrase in the first language variation, the context determination module 406 may determine that the portion of the text is incorrect. In some embodiments, if the portion of the text is a word or phrase in the first language variation, the context determination module 406 may determine whether the portion of the text is contextually proper. In certain embodiments, if the portion of the text is not contextually proper, the context determination module 406 may determine that the portion of the text is incorrect. In various embodiments, if the portion of the text is contextually proper, the context determination module 406 may determine that the portion of the text is correct.

In some embodiments, the feedback module 408, in response to converting the audible input corresponding to the portion of the text to the revised portion of the text, may request feedback from a user to indicate whether the revised portion of the text is correct. For example, if a word from a second language variation is used to convert a portion of the audible input to text, the feedback module 408 may provide a prompt (e.g., audio prompt, message prompt, pop-up prompt, etc.) to the user and ask the user to verify whether the conversion based on the second language variation is correct. For example, if the audible input "kasa" is interpreted to mean "umbrella," the feedback module 408 may request feedback from the user to indicate whether the word "kasa" should be replaced with its English equivalent "umbrella."

In certain embodiments, the revision module 410, in response to the user indicating that the revised portion of the text is correct, may replace the portion of the text with the revised portion of the text. This may happen as a result of the user providing feedback to the feedback module 408 indicating that the revised portion of the text is correct. For example, in the following originally converted text "remind me to bring my kasa tomorrow," kasa may be replaced with umbrella to result in the following "remind me to bring my umbrella tomorrow."

Figure 5:
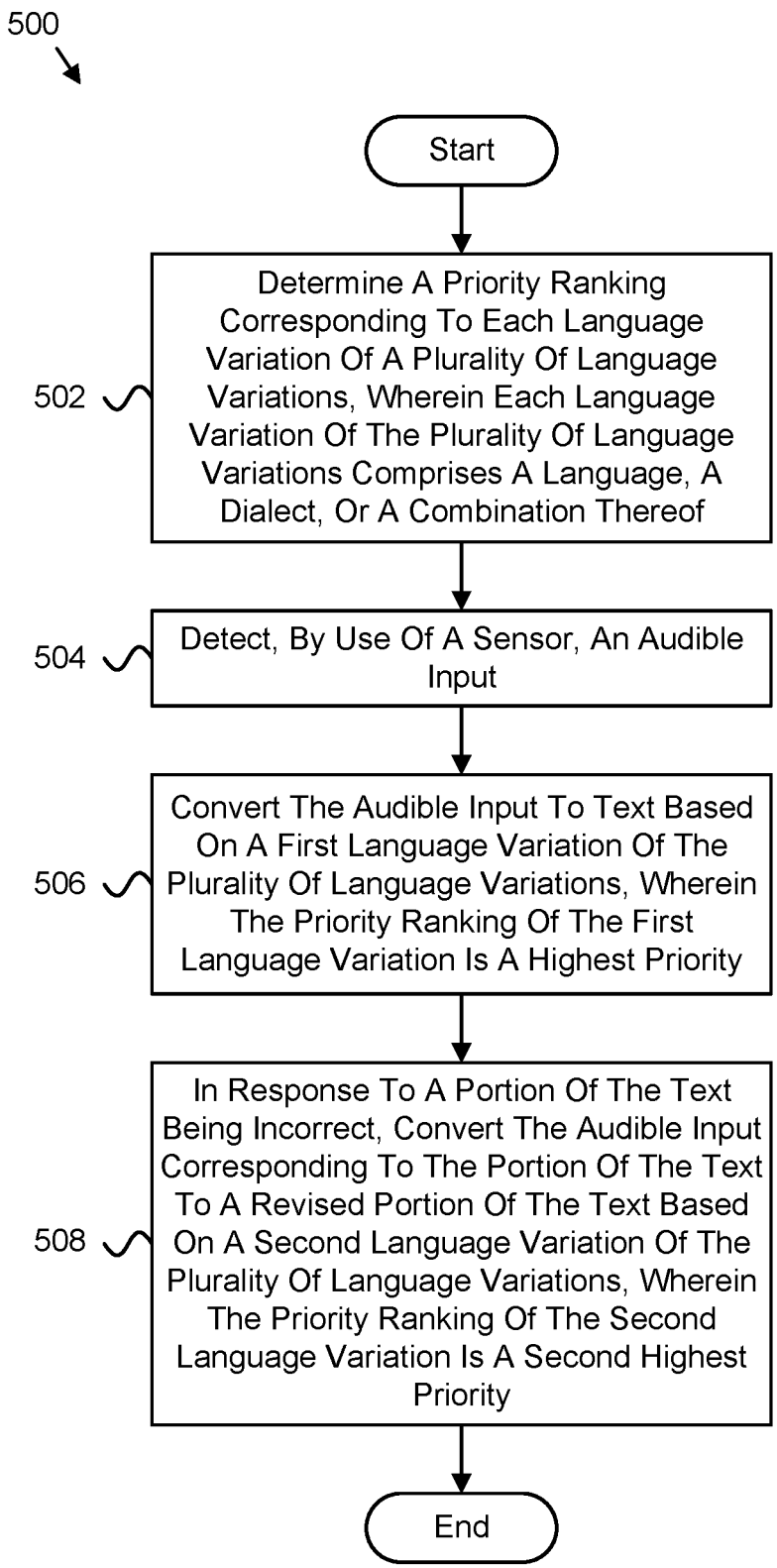
FIG. 5 is a schematic flow chart diagram illustrating an embodiment of a method for converting multiple language variations.

FIG. 5 is a schematic flow chart diagram illustrating an embodiment of a method 500 for converting multiple language variations. In some embodiments, the method 500 is performed by an apparatus, such as the information handling device 102. In other embodiments, the method 500 may be performed by a module, such as the language processing module 104. In certain embodiments, the method 500 may be performed by a processor executing program code, for example, a microcontroller, a microprocessor, a CPU, a GPU, an auxiliary processing unit, a FPGA, or the like.

The method 500 may include determining 502 a priority ranking corresponding to each language variation of multiple language variations. In such a method 500, each language variation of the multiple language variations may include a language and/or a dialect. In certain embodiments, the priority module 302 may determine 502 the priority ranking corresponding to each language variation of the multiple language variations.

The method 500 may include detecting 504, by use of a sensor (e.g., the sensor 212), an audible input. In some embodiments, the input detection module 304 may detect 504 the audible input.

The method 500 may include converting 506 the audible input to text based on a first language variation of the multiple language variations. In the method 500, the priority ranking of the first language variation may be a highest priority among the multiple language variations (e.g., a higher priority than all other language variations of the multiple language variations). In some embodiments, the primary conversion module 306 may convert 506 the audible input to the text based on the first language variation.

The method 500 may include, in response to a portion of the text being incorrect, converting 508 the audible input corresponding to the portion of the text to a revised portion of the text based on a second language variation of the multiple language variations, and the method 500 may end. In the method 500, the priority ranking of the second language variation may be a second highest priority among the multiple language variations (e.g., a higher priority than all other language variations of the multiple language variations except the first language variation). In some embodiments, the secondary conversion module 308 may, in response to the portion of the text being incorrect, convert 508 the audible input corresponding to the portion of the text to the revised portion of the text based on the second language variation.

In some embodiments, the method 500 includes receiving a user selection that indicates the multiple language variations corresponding to the user. In various embodiments, the method 500 includes receiving a user selection that indicates the priority ranking. In one embodiment, the method 500 includes receiving a user selection that indicates the priority ranking for each geographic region of multiple geographic regions.

In some embodiments, the method 500 includes detecting a physical location of a user and setting a priority of the priority ranking to a language variation of the multiple language variations that corresponds to the physical location. In certain embodiments, the method 500 includes determining whether the portion of the text is incorrect.

In some embodiments, determining whether the portion of the text is incorrect includes: determining whether the portion of the text is a word in the first language variation; in response to determining that the portion of the text is not a word in the first language variation, determining that the portion of the text is incorrect; and in response to determining that the portion of the text is a word in the first language variation, determining whether the portion of the text is contextually proper, wherein: in response to determining that the portion of the text is not contextually proper, determining that the portion of the text is incorrect; and in response to determining that the portion of the text is contextually proper, determining that the portion of the text is correct.

In various embodiments, the method 500 includes, in response to converting the audible input corresponding to the portion of the text to the revised portion of the text, requesting feedback from a user to indicate whether the revised portion of the text is correct. In certain embodiments, the method 500 includes, in response to the user indicating that the revised portion of the text is correct, replacing the portion of the text with the revised portion of the text.

Figure 6:
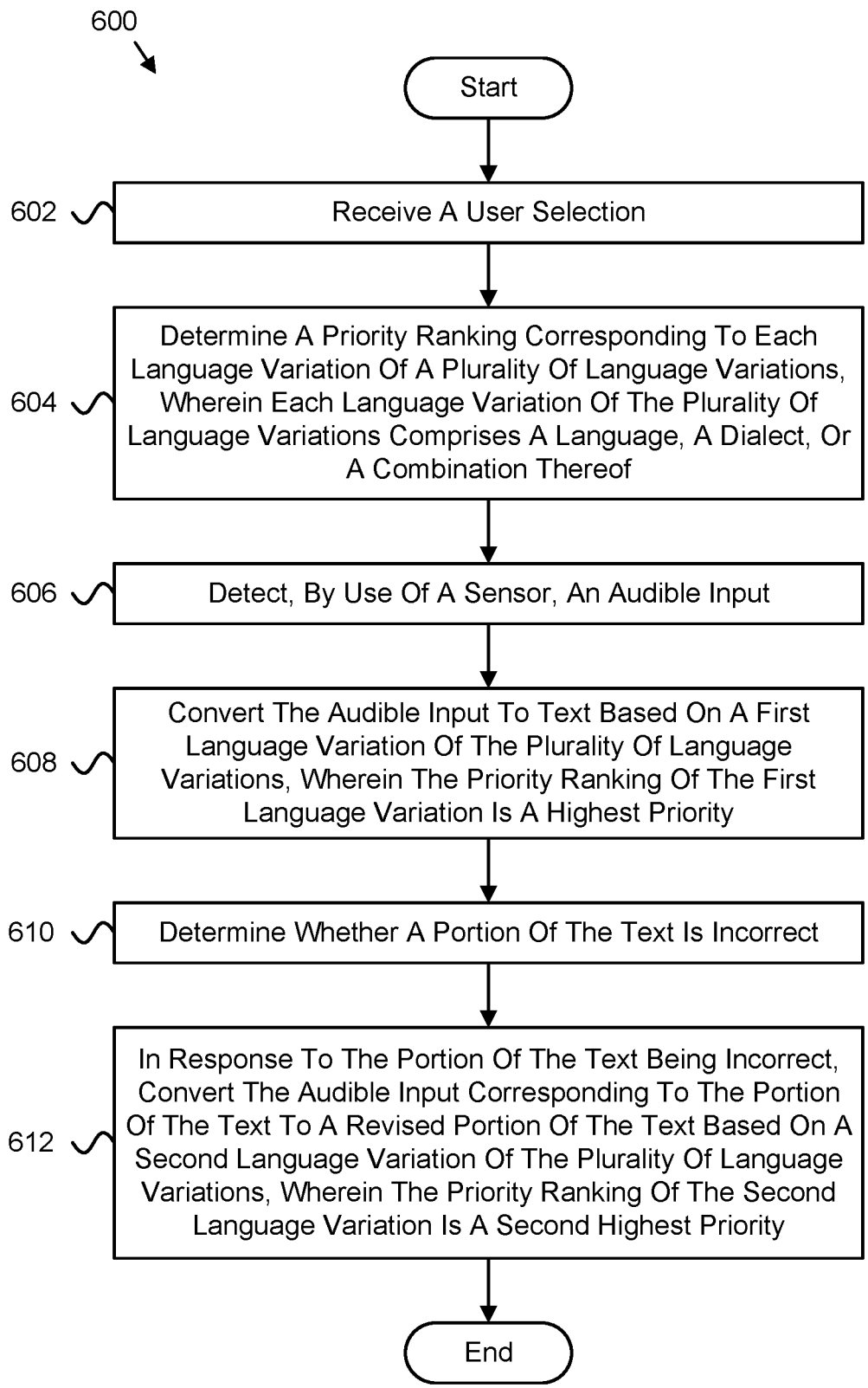
FIG. 6 is a schematic flow chart diagram illustrating another embodiment of a method for converting multiple language variations.

FIG. 6 is a schematic flow chart diagram illustrating another embodiment of a method 600 for converting multiple language variations. In some embodiments, the method 600 is performed by an apparatus, such as the information handling device 102. In other embodiments, the method 600 may be performed by a module, such as the language processing module 104. In certain embodiments, the method 600 may be performed by a processor executing program code, for example, a microcontroller, a microprocessor, a CPU, a GPU, an auxiliary processing unit, a FPGA, or the like.

The method 600 may include receiving 602 a user selection. In certain embodiments, the user selection module 402 may receive 602 the user selection. In some embodiments, the user selection indicates the multiple language variations corresponding to the user. In various embodiments, the user selection indicates a priority ranking. In one embodiment, the user selection indicates a priority ranking for each geographic region of multiple geographic regions.

The method 600 may include determining 604 a priority ranking corresponding to each language variation of multiple language variations. In such a method 600, each language variation of the multiple language variations may include a language and/or a dialect. In certain embodiments, the priority module 302 may determine 604 the priority ranking corresponding to each language variation of the multiple language variations.

The method 600 may include detecting 606, by use of a sensor (e.g., the sensor 212), an audible input. In some embodiments, the input detection module 304 may detect 606 the audible input.

The method 600 may include converting 608 the audible input to text based on a first language variation of the multiple language variations. In such a method 600, the priority ranking of the first language variation may be a highest priority among the multiple language variations (e.g., a higher priority than all other language variations of the multiple language variations). In some embodiments, the primary conversion module 306 may convert 608 the audible input to the text based on the first language variation.

The method 600 may include determining 610 whether a portion of the text is incorrect. In certain embodiments, the context determination module 406 may determine 610 whether the portion of the text is incorrect. In some embodiments, determining 610 whether the portion of the text is incorrect includes: determining whether the portion of the text is a word in the first language variation; in response to determining that the portion of the text is not a word in the first language variation, determining that the portion of the text is incorrect; and in response to determining that the portion of the text is a word in the first language variation, determining whether the portion of the text is contextually proper, wherein: in response to determining that the portion of the text is not contextually proper, determining that the portion of the text is incorrect; and in response to determining that the portion of the text is contextually proper, determining that the portion of the text is correct.

The method 600 may include, in response to the portion of the text being incorrect, converting 612 the audible input corresponding to the portion of the text to a revised portion of the text based on a second language variation of the multiple language variations, and the method 600 may end. In the method 600, the priority ranking of the second language variation may be a second highest priority among the multiple language variations (e.g., a higher priority than all other language variations of the multiple language variations except the first language variation). In some embodiments, the secondary conversion module 308 may, in response to the portion of the text being incorrect, convert 612 the audible input corresponding to the portion of the text to the revised portion of the text based on the second language variation.

In some embodiments, the method 600 includes detecting a physical location of a user and setting a priority of the priority ranking to a language variation of the multiple language variations that corresponds to the physical location.

In various embodiments, the method 600 includes, in response to converting the audible input corresponding to the portion of the text to the revised portion of the text, requesting feedback from a user to indicate whether the revised portion of the text is correct. In certain embodiments, the method 600 includes, in response to the user indicating that the revised portion of the text is correct, replacing the portion of the text with the revised portion of the text.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a sensor; and
a memory that stores code executable by the processor to:
receive a user selection that indicates:
a plurality of spoken language variations spoken by the user; and
a priority ranking corresponding to each spoken language variation of the plurality of spoken language variations spoken by the user, wherein each spoken language variation of the plurality of spoken language variations comprises a language, a dialect, or a combination thereof;
detect, by use of the sensor, an audible input made by the user;
convert the audible input to text based on a first spoken language variation of the plurality of spoken language variations, wherein the priority ranking of the first spoken language variation is a highest priority; and
in response to a portion of the text being incorrect, convert the audible input corresponding to the portion of the text to a revised portion of the text based on a second spoken language variation of the plurality of spoken language variations, wherein the priority ranking of the second language variation is a second highest priority.

2. The apparatus of claim 1, wherein the code executable by the processor receives a user selection that indicates the priority ranking for each geographic region of a plurality of geographic regions.

3. The apparatus of claim 1, wherein the code executable by the processor detects a physical location of a user and sets a priority of the priority ranking to a spoken language variation of the plurality of spoken language variations that corresponds to the physical location.

4. A method comprising:
receiving a user selection that indicates:
a plurality of spoken language variations spoken by the user, and
a priority ranking corresponding to each spoken language variation of the plurality of spoken language variations, wherein each spoken language variation of the plurality of spoken language variations comprises a language, a dialect, or a combination thereof;
detecting, by use of a sensor, an audible input made by the user;
converting the audible input to text based on a first spoken language variation of the plurality of spoken language variations, wherein the priority ranking of the first spoken language variation is a highest priority; and
in response to a portion of the text being incorrect, converting the audible input corresponding to the portion of the text to a revised portion of the text based on a second spoken language variation of the plurality of spoken language variations, wherein the priority ranking of the second spoken language variation is a second highest priority.

5. The method of claim 4, further comprising receiving a user selection that indicates the priority ranking for each geographic region of a plurality of geographic regions.

6. The method of claim 4, further comprising detecting a physical location of a user and setting a priority of the priority ranking to a spoken language variation of the plurality of spoken language variations that corresponds to the physical location.

7. The method of claim 4, wherein determining whether the portion of the text is incorrect comprises:
determining whether the portion of the text is a word in the first spoken language variation;
in response to determining that the portion of the text is not a word in the first spoken language variation, determining that the portion of the text is incorrect; and
in response to determining that the portion of the text is a word in the first spoken language variation, determining whether the portion of the text is contextually proper, wherein:

in response to determining that the portion of the text is not contextually proper, determining that the portion of the text is incorrect; and in response to determining that the portion of the text is contextually proper, determining that the portion of the text is correct.

8. The method of claim 4, further comprising, in response to converting the audible input corresponding to the portion of the text to the revised portion of the text, requesting feedback from a user to indicate whether the revised portion of the text is correct.

9. The method of claim 8, further comprising, in response to the user indicating that the revised portion of the text is correct, replacing the portion of the text with the revised portion of the text.

10. A program product comprising a computer readable storage medium that stores code executable by a processor, the executable code comprising code to perform:

receiving a user selection that indicates:
 a plurality of spoken language variations spoken by the user; and
 a priority ranking corresponding to each spoken language variation of the plurality of spoken language variations, wherein each spoken language variation of the plurality of spoken language variations comprises a language, a dialect, or a combination thereof;

detecting, by use of a sensor, an audible input made by the user;

converting the audible input to text based on a first spoken language variation of the plurality of spoken language variations, wherein the priority ranking of the first spoken language variation is a highest priority; and in response to a portion of the text being incorrect, converting the audible input corresponding to the portion of the text to a revised portion of the text based on a second spoken language variation of the plurality of spoken language variations, wherein the priority ranking of the second spoken language variation is a second highest priority.

11. The program product of claim 10, wherein the executable code further comprises code to perform detecting a physical location of a user and setting a priority of the priority ranking to a spoken language variation of the plurality of spoken language variations that corresponds to the physical location.

12. The program product of claim 10, wherein determining whether the portion of the text is incorrect comprises:

determining whether the portion of the text is a word in the first spoken language variation;

in response to determining that the portion of the text is not a word in the first spoken language variation, determining that the portion of the text is incorrect; and in response to determining that the portion of the text is a word in the first spoken language variation, determining whether the portion of the text is contextually proper, wherein:

in response to determining that the portion of the text is not contextually proper, determining that the portion of the text is incorrect; and in response to determining that the portion of the text is contextually proper, determining that the portion of the text is correct.

13. The program product of claim 10, wherein the executable code further comprises code to perform, in response to converting the audible input corresponding to the portion of the text to the revised portion of the text, requesting feedback from a user to indicate whether the revised portion of the text is correct.

14. The program product of claim 13, wherein the executable code further comprises code to perform, in response to the user indicating that the revised portion of the text is correct, replacing the portion of the text with the revised portion of the text.

\* \* \* \* \*